United States Patent
Feng et al.

(10) Patent No.: US 8,206,538 B2
(45) Date of Patent: Jun. 26, 2012

(54) COMPOSITE WITH THERMO-FORMABILITY, METHOD FOR MAKING THE SAME AND METHOD FOR MAKING A CASING WITH TEXTURE ON SURFACE THEREOF

(75) Inventors: Chung-Chih Feng, Kaohsiung (TW); I-Peng Yao, Kaohsiung (TW); Ko-Feng Wang, Kaohsiung (TW); Kai-Feng Kang, Kaohsiung (TW); Chun-Yi Kuo, Kaohsiung (TW)

(73) Assignee: San Fang Chemical Industry Co., Ltd., Kaohsiung (TW)

( * ) Notice: Subject to any disclaimer, the term of this patent is extended or adjusted under 35 U.S.C. 154(b) by 429 days.

(21) Appl. No.: 12/418,529

(22) Filed: Apr. 3, 2009

(65) Prior Publication Data

US 2009/0288761 A1 Nov. 26, 2009

(30) Foreign Application Priority Data

May 26, 2008 (TW) .............................. 97119433 A (51) Int. Cl.
*B05D 1/36* (2006.01)
*B05D 3/00* (2006.01)
*B29C 45/14* (2006.01)

(52) U.S. Cl. ................. 156/245; 427/407.1; 427/385.5

(58) Field of Classification Search ............... 427/407.1, 427/385.5; 156/245; 428/423.1, 423.3
See application file for complete search history.

(56) References Cited

U.S. PATENT DOCUMENTS

| 6,773,804 | B2 * | 8/2004 | Enlow et al. ............... 428/327 |
| 7,511,082 | B2 * | 3/2009 | Nakamura et al. ........... 521/172 |
| 2007/0196628 | A1 * | 8/2007 | Feng et al. ................. 428/195.1 |
| 2009/0041997 | A1 * | 2/2009 | Feng et al. ................. 428/215 |

FOREIGN PATENT DOCUMENTS

| CN | 1303283 C | 3/2007 |
| CN | 101048043 A | 10/2007 |

OTHER PUBLICATIONS

Chinese Office Action dated Feb. 28, 2011 for 200810146712.9, which is a corresponding Chinese application, and the article titled, "Application of Nano-Scale CaCO3 in Hydroxyl Terminated Polybutadiene Pu Paint".
Zou Derong, Application of Nano-Scale CaCO3 in Hydroxyl Terminated Polybutadiene/ Pu Paint.

\* cited by examiner

*Primary Examiner* — Thao T. Tran
(74) *Attorney, Agent, or Firm* — WPAT, P.C.; Anthony King (57) ABSTRACT

The present invention relates to a composite with thermo-formability, a method for making the same and a method for making a casing with a texture on the surface thereof. The composite includes a polyurethane medium layer, a thermo-formable resin layer, a base layer and a surface layer. The thermo-formable resin layer is disposed on the polyurethane medium layer, and includes polyol. The base layer is disposed on the thermo-formable resin layer. The surface layer is disposed on the base layer. As a result, the composite has good stability after thermoforming, and plastic can be injected into the composite, so a PC film is unnecessary. Moreover, the composite may be adhered to a substrate directly or after thermoforming.

5 Claims, 13 Drawing Sheets

COMPOSITE WITH THERMO-FORMABILITY, METHOD FOR MAKING THE SAME AND METHOD FOR MAKING A CASING WITH TEXTURE ON SURFACE THEREOF

BACKGROUND OF THE INVENTION

1. Field of the Invention

The present invention relates to a composite, a method for making the same and a method for making a casing, and more particularly to a composite with thermo-formability, a method for making the same and a method for making a casing with a texture on the surface thereof.

2. Description of the Related Art

Figure 1:
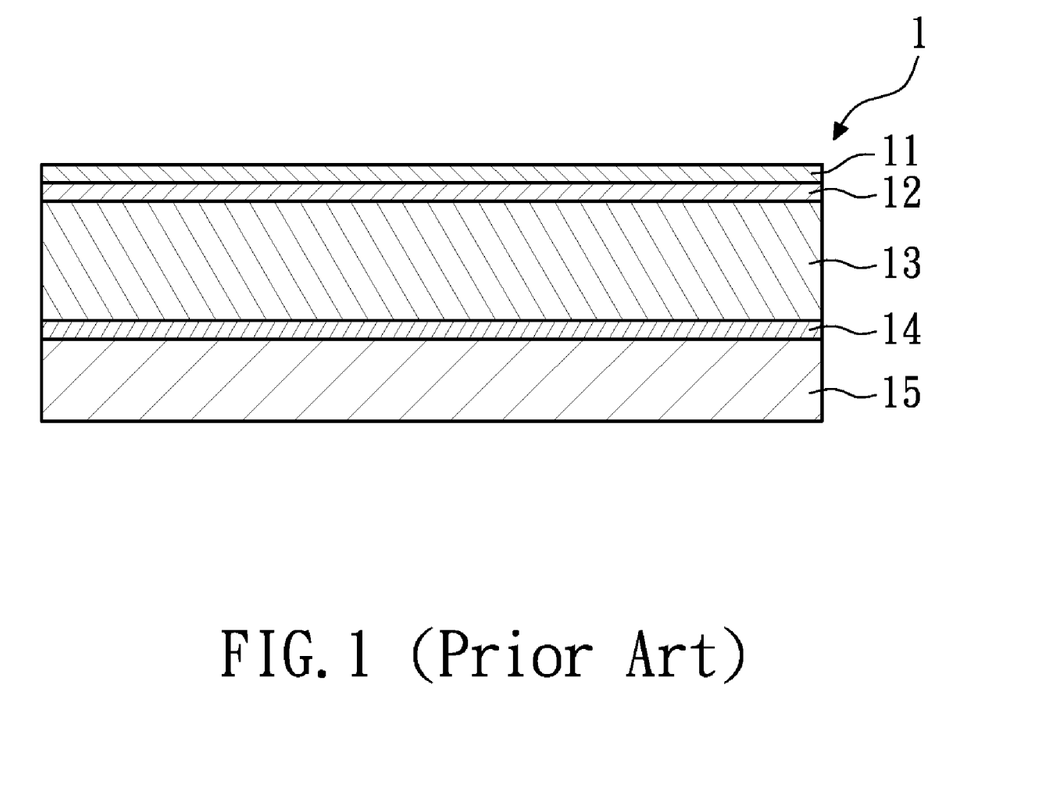
FIG. 1 is the cross-sectional view of the conventional composite.
Figure 2:
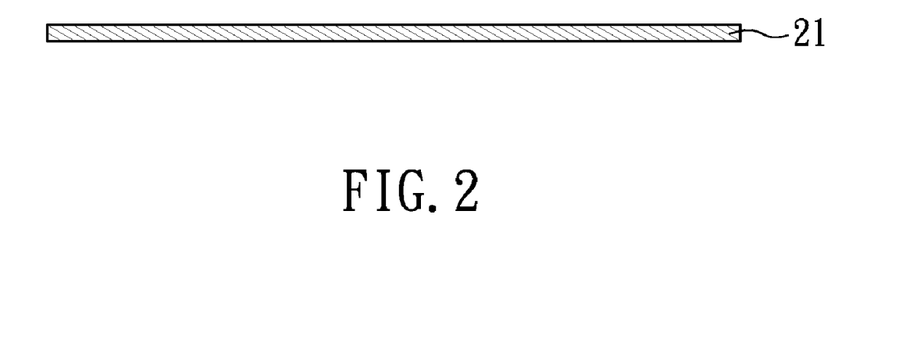
FIGS. 2 to 8 are cross-sectional views of a method for making a composite with thermo-formability according to a first embodiment of the present invention.
Figure 3:
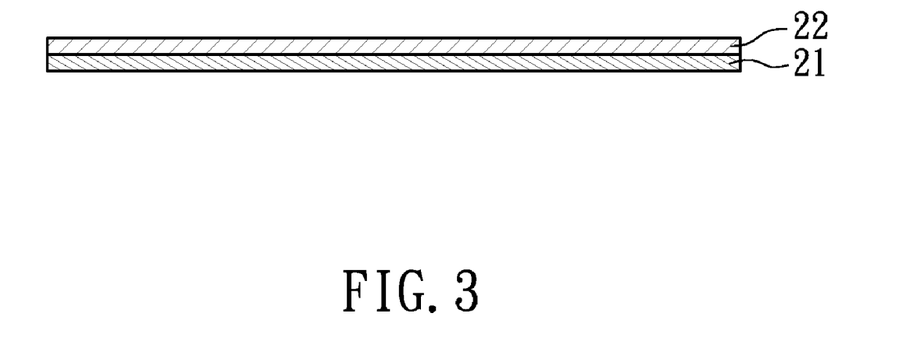

FIG. 1 shows a cross-sectional view of a conventional composite. The conventional composite 1 includes a PC film 15, a second adhesive layer 14, a polyurethane wet foamed layer 13, a first adhesive layer 12 and a surface layer 11. The material of the PC film 15 is thermoplastic. The second adhesive layer 14 is disposed on the PC film 15. The polyurethane wet foamed layer 13 is disposed on the second adhesive layer 14. The first adhesive layer 12 is disposed on the polyurethane wet foamed layer 13. The surface layer 11 is disposed on the first adhesive layer 12, the material of the surface layer 11 is polyurethane resin, and the surface layer 11 has a texture. The conventional composite 1 is attached to a substrate, which is usually a casing of an electrical device (for example, a notebook, PDA, mobile phone or LCD). After heat pressing, the conventional composite 1 is attached to the casing by the PC film 15. In such a manner, the texture of the surface layer 11 and the artificial leather of the conventional composite 1 can improve the tactile quality of the electrical device.

The conventional composite 1 has the following disadvantage. The PC film 15 easily peels off or warps after thermoforming, and has poor formability, which leads to difficulty in the following processes, and further leads to a low yield rate.

Therefore, it is necessary to provide a composite with thermo-formability, a method for making the same and a method for making a casing with a texture on the surface thereof to solve the above problems.

SUMMARY OF THE INVENTION

The present invention is directed to a method for making a composite with thermo-formability. The method comprises the following steps: (a) providing a release paper; (b) forming a surface layer on the release paper; (c) forming a base layer on the surface layer; (d) forming a thermo-formable resin layer that includes polyol on the base layer; (e) forming a polyurethane medium layer on the thermo-formable resin layer; and (f) removing the release paper.

The present invention is further directed to a composite with thermo-formability. The composite includes a polyurethane medium layer, a thermo-formable resin layer, a base layer and a surface layer. The thermo-formable resin layer is disposed on the polyurethane medium layer, and includes polyol. The base layer is disposed on the thermo-formable resin layer. The surface layer is disposed on the base layer.

The present invention is further directed to a method for making a casing with a texture on the surface thereof. The method comprises the following steps: (a) providing a composite that includes a polyurethane medium layer, a thermo-formable resin layer, a base layer and a surface layer; the thermo-formable resin layer includes polyol and is disposed on the polyurethane medium layer, the base layer is disposed on the thermo-formable resin layer, the surface layer is disposed on the base layer, and the surface layer has a texture on the surface thereof; (b) thermoforming the composite into a 3D appearance by a mold; (c) providing a casing; and (d) adhering the composite to the casing.

The present invention is further directed to a method for making a casing with a texture on the surface thereof. The method comprises the following steps: (a) providing a composite that includes a polyurethane medium layer, a thermo-formable resin layer, a base layer and a surface layer; the thermo-formable resin layer includes polyol and is disposed on the polyurethane medium layer, the base layer is disposed on the thermo-formable resin layer, the surface layer is disposed on the base layer, and the surface layer has a texture on the surface thereof; (b) thermoforming the composite into a 3D appearance by a mold; the composite has an inner surface and an outer surface, and the inner surface defines an inner space; and (c) forming plastic on the inner surface of the inner space by injection molding so as to form a casing.

As a result, the composite has good stability after thermoforming and the PC film will not peel off as in the conventional composite. In addition, the plastic can be injected into the composite, so the conventional PC film is unnecessary. Moreover, the composite of the present invention can be adhered to a substrate directly or after thermoforming.

DETAILED DESCRIPTION OF THE INVENTION

Figure 4:
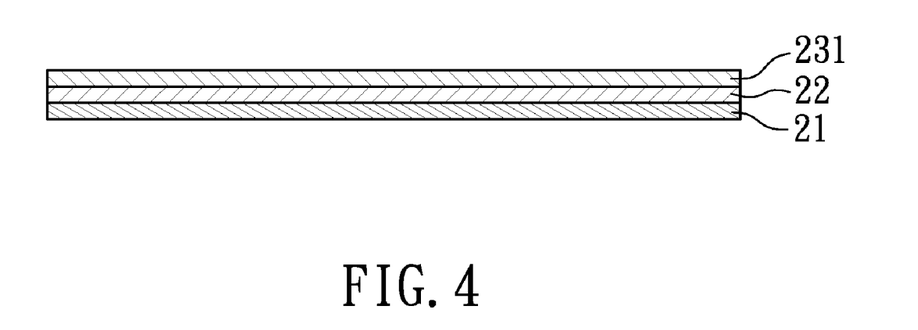
Figure 5:
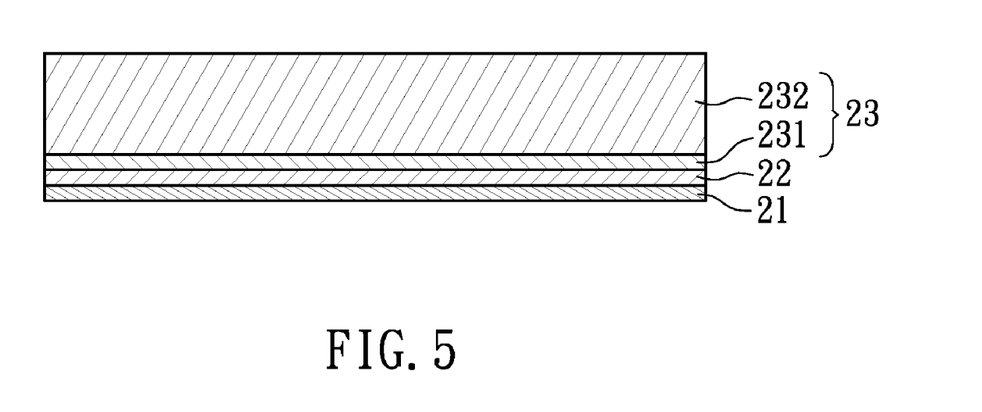

FIGS. 2 to 8 show the cross-sectional views of the method for making a composite with thermo-formability according to the first embodiment of the present invention. First, referring to FIG. 2, a release paper 21 is provided. In the embodiment, the surface of the release paper 21 has a texture. Then, referring to FIG. 3, a surface layer 22 is formed on the release paper 21. In the embodiment, the surface layer 22 is formed by coating, and includes a polyurethane resin, resistant and colorant. The resistant includes silicon so that the abrasion resistance is increased, and the colorant increases the UV resistance and the solvent resistance. In the embodiment, the method further comprises a step of drying the surface layer 22. Then, a base layer 23 (FIG. 5) is formed on the surface layer 22. In the embodiment, an adhesive layer 231 is first coated on the surface layer 22, as shown in FIG. 4. The material of the adhesive layer 231 may be pressure sensitive adhesive, moisture-curing resin, one-component resin or two-component resin. Then, the adhesive layer 231 is dried. Finally, a polyurethane wet foamed layer 232 is formed on the adhesive layer 231 so as to form the base layer 23, as shown in FIG. 5.

Figure 6:
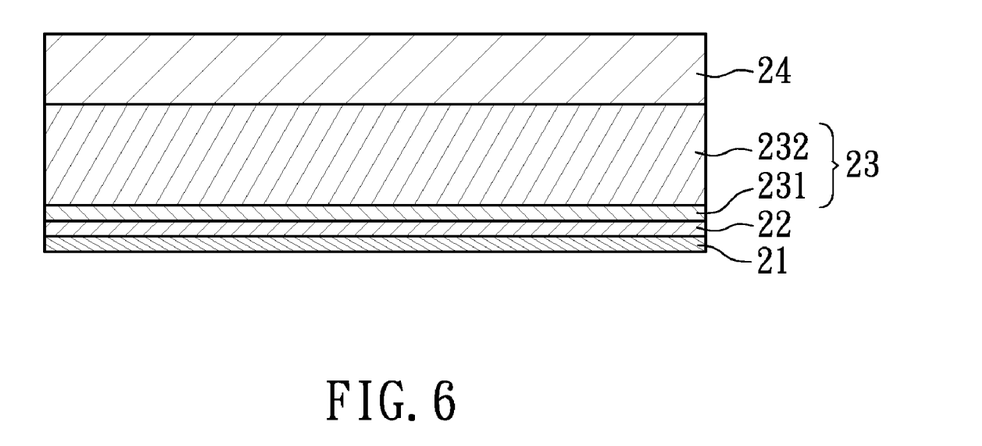

Referring to FIG. 6, a thermo-formable resin layer 24 is formed on the base layer 23. The thermo-formable resin layer 24 includes polyol. In the embodiment, the thermo-formable resin layer 24 is formed by coating, and further includes isocyanate. In the embodiment, the polyol is polycarbonate. In the embodiment, the method further comprises a step of drying the thermo-formable resin layer 24.

Figure 7:
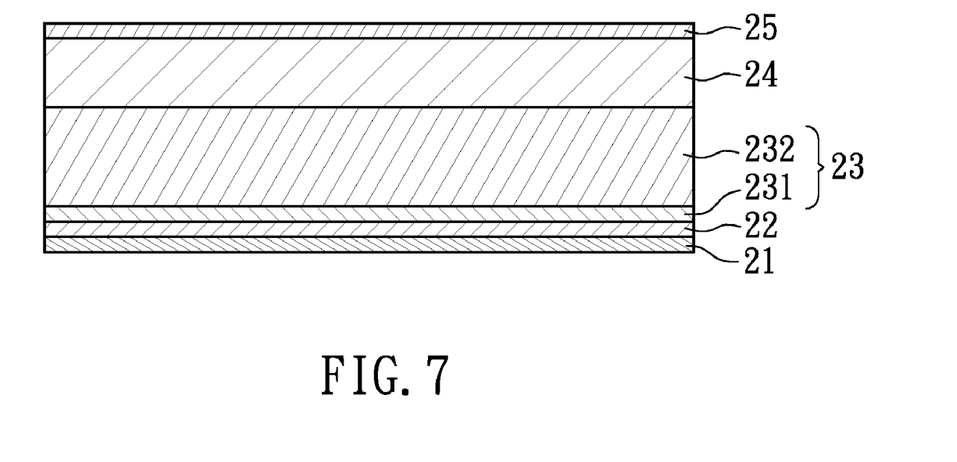

Referring to FIG. 7, a polyurethane medium layer 25 is formed on the thermo-formable resin layer 24. In the embodiment, the polyurethane medium layer 25 is formed by coating, and includes polyurethane resin and powder of inorganic salt of $CaCO_3$, and the modulus of deformation of the polyurethane resin is 20 to 150. In the embodiment, the method further comprises an aging step, which includes drying constantly over 24 hours in an oven without removing the release paper 21. Finally, referring to FIG. 8, the release paper 21 is removed so as to get a composite 2 with thermo-formability, and the composite 2 is turned upside down. After the release paper 21 is removed, the surface of the surface layer 22 has a texture corresponding to the texture of the release paper 21.

Figure 8:
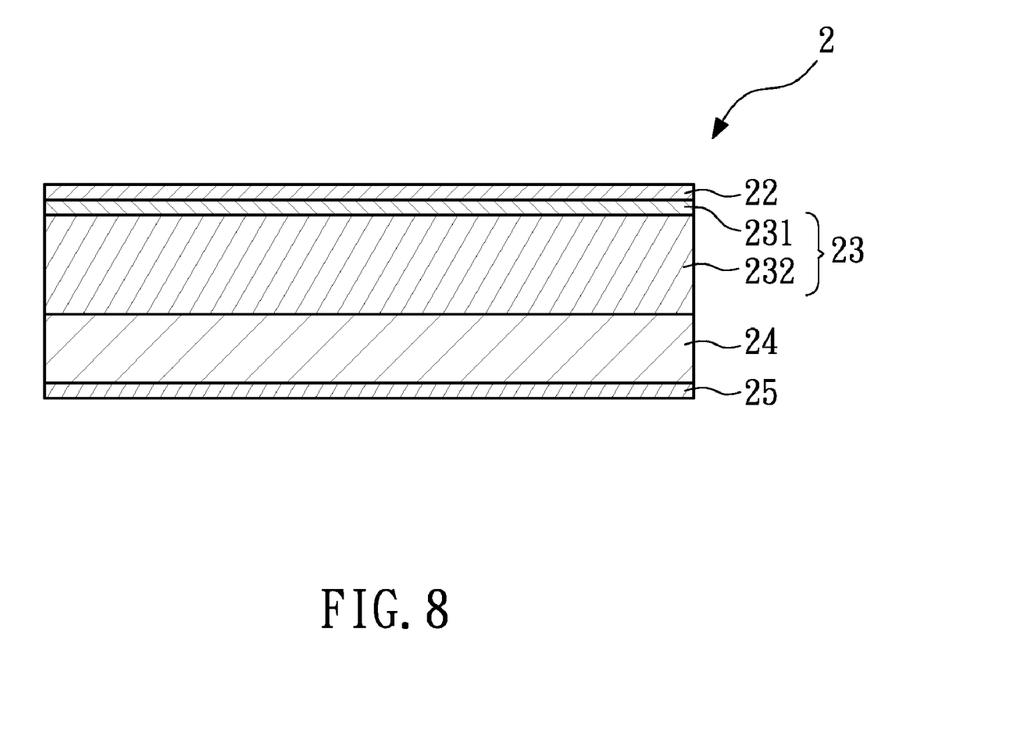
Figure 9:
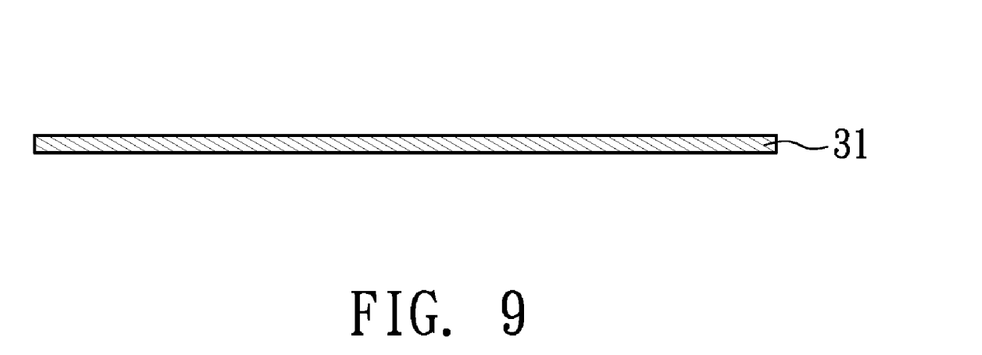
FIGS. 9 to 14 are cross-sectional views of a method for making a composite with thermo-formability according to a second embodiment of the present invention.
Figure 10:
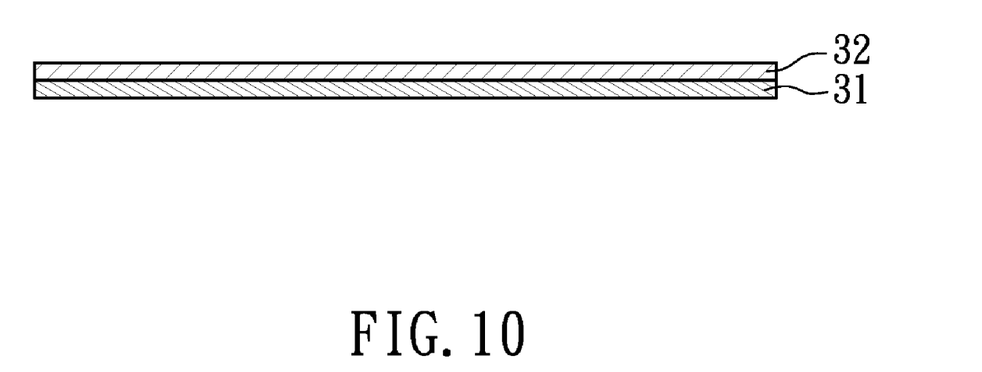
Figure 11:
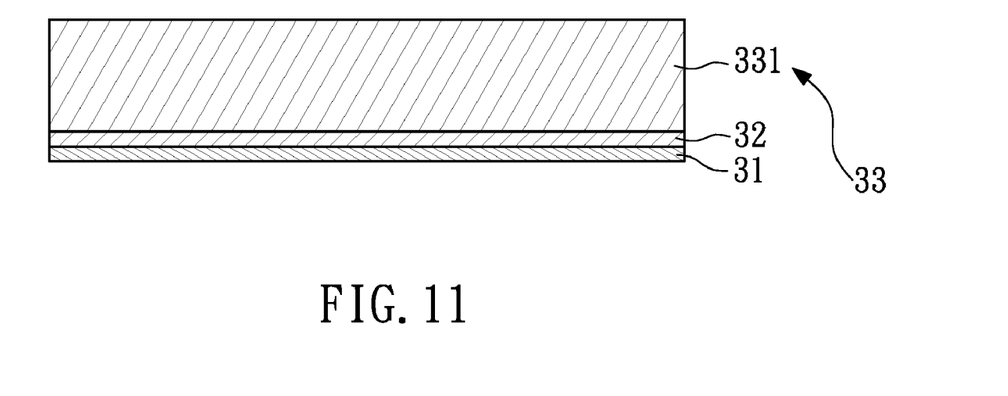

FIG. 8 shows the cross-sectional view of the composite with thermo-formability according to the first embodiment of the present invention. The composite 2 includes a polyurethane medium layer 25, a thermo-formable resin layer 24, a base layer 23 and a surface layer 22. In the embodiment, the polyurethane medium layer 25 includes polyurethane resin and powder of inorganic salt of $CaCO_3$, and the modulus of deformation of the polyurethane resin is 20 to 150. The thermo-formable resin layer 24 is disposed on the polyurethane medium layer 25, and includes polyol. In the embodiment, the thermo-formable resin layer 24 further includes isocyanate, and the polyol is polycarbonate. The base layer 23 is disposed on the thermo-formable resin layer 24. In the embodiment, the base layer 23 includes an adhesive layer 231 and a polyurethane wet foamed layer 232. The material of the adhesive layer 231 may be pressure sensitive adhesive, moisture-curing resin, one-component resin or two-component resin. The polyurethane wet foamed layer 232 is adhered to the surface layer 22 by the adhesive layer 231. The surface layer 22 is disposed on the base layer 23. In the embodiment, the surface of the surface layer 22 has a texture, and includes polyurethane resin, resistant and colorant. The resistant includes silicon so as to increase the abrasion resistance, and the colorant increases the UV resistance and the solvent resistance.

In the embodiment, the thickness of the polyurethane resin layer 25 is 0.01 to 0.15 mm, the thickness of the thermo-formable resin layer 24 is 0.10 to 0.20 mm, the thickness of the polyurethane wet foamed layer 232 is 0.20 to 0.45 mm, the thickness of the adhesive layer 231 is 0.01 to 0.15 mm, the thickness of the surface layer 22 is 0.01 to 0.05 mm, and the total thickness of the composite 2 is 0.33 to 1.00 mm.

FIGS. 9 to 14 show the cross-sectional views of the method for making a composite with thermo-formability according to the second embodiment of the present invention. First, referring to FIG. 9, a release paper 31 is provided. In the embodiment, the surface of the release paper 31 has a texture. Then, referring to FIG. 10, a surface layer 32 is formed on the release paper 31. In the embodiment, the surface layer 32 is formed by coating, and includes polyurethane resin, resistant and colorant. The resistant includes silicon so as to increase the abrasion resistance, and the colorant increases the UV resistance and the solvent resistance. In the embodiment, the method further comprises a step of drying the surface layer 32. Then, referring to FIG. 11, a base layer 33 is formed on the surface layer 32. In the embodiment, a high-solid resin layer 331 is first coated on the surface layer 32, and the solid percentage of the high-solid resin layer 331 is more than 40%. Then, the high-solid resin layer 331 is dried so as to form the base layer 33.

Figure 12:
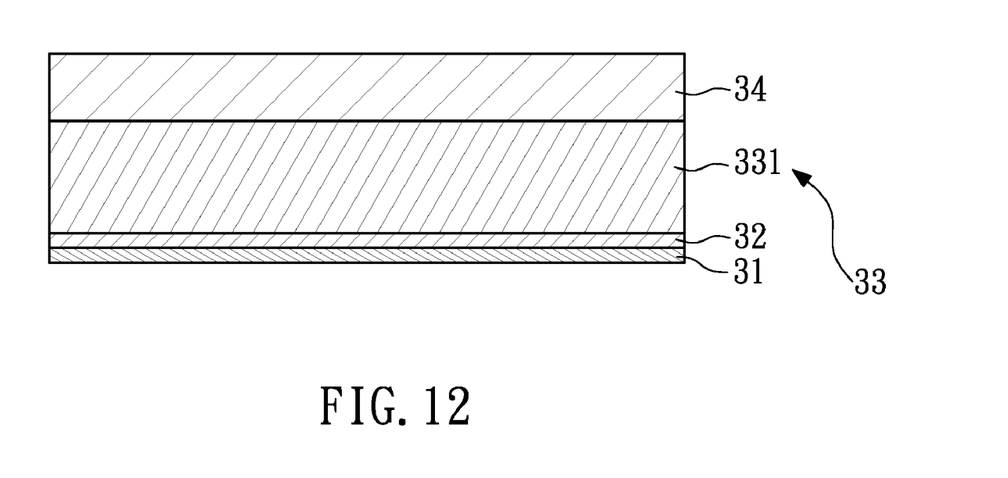

Referring to FIG. 12, a thermo-formable resin layer 34 is formed on the base layer 33. The thermo-formable resin layer 34 includes polyol. In the embodiment, the thermo-formable resin layer 34 is formed by coating, and further includes isocyanate. In the embodiment, the polyol is polycarbonate. In the embodiment, the method further comprises a step of drying the thermo-formable resin layer 34.

Figure 13:
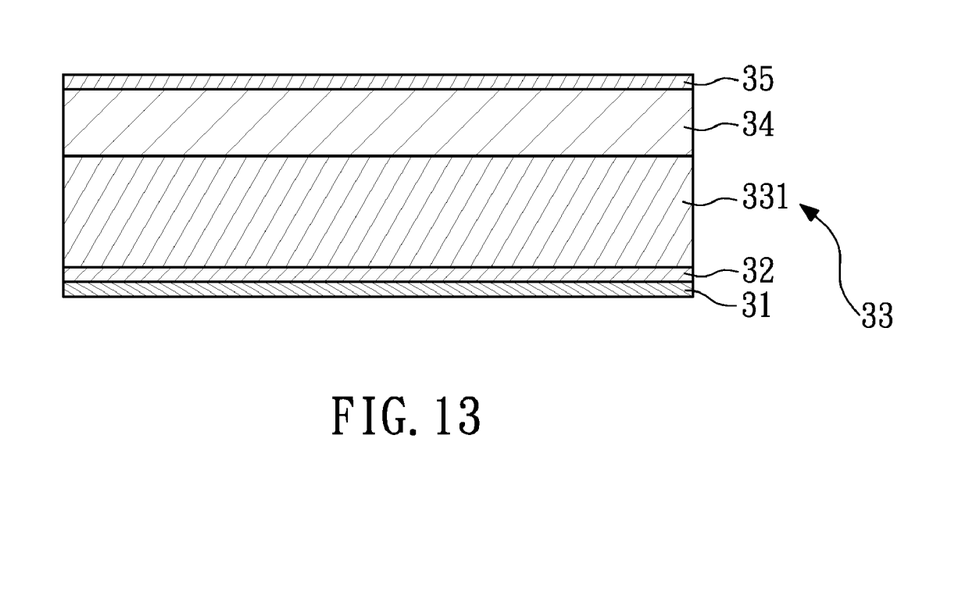

Referring to FIG. 13, a polyurethane medium layer 35 is formed on the thermo-formable resin layer 34. In the embodiment, the polyurethane medium layer 35 is formed by coating, and includes polyurethane resin and powder of inorganic salt of $CaCO_3$, and the modulus of deformation of the polyurethane resin is 20 to 150. In the embodiment, the method further comprises an aging step, which includes drying constantly over 24 hours in an oven without removing the release paper 31. Finally, referring to FIG. 14, the release paper 31 is removed so as to get a composite 3 with thermo-formability, and the composite 3 is turned upside down. After the release paper 31 is removed, the surface of the surface layer 32 has a texture corresponding to the texture of the release paper 31.

Figure 14:
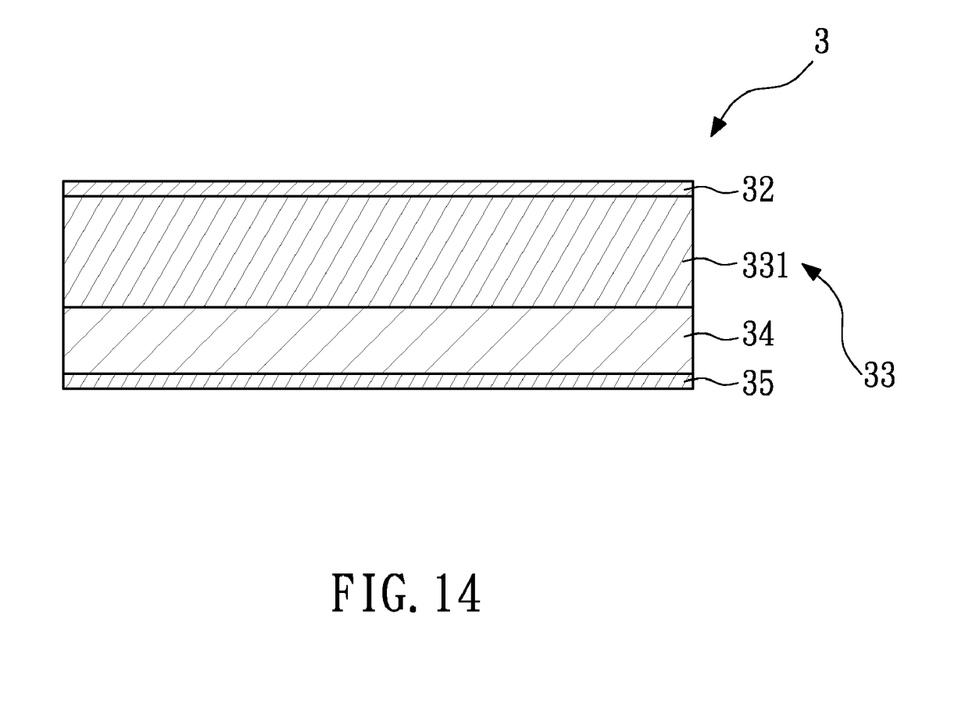

FIG. 14 shows the cross-sectional view of the composite with thermo-formability according to the second embodiment of the present invention. The composite 3 includes a polyurethane medium layer 35, a thermo-formable resin layer 34, a base layer 33 and a surface layer 32. In the embodiment, the polyurethane medium layer 35 includes polyurethane resin and powder of inorganic salt of $CaCO_3$, and the modulus of deformation of the polyurethane resin is 20 to 150. The thermo-formable resin layer 34 is disposed on the polyurethane medium layer 35, and includes polyol. In the embodiment, the thermo-formable resin layer 34 further includes isocyanate, and the polyol is polycarbonate. The base layer 33 is disposed on the thermo-formable resin layer 34. In the embodiment, the base layer 33 is a high-solid resin layer 331, and the solid percentage of the high-solid resin layer 331 is more than 40%. The surface layer 32 is disposed on the base layer 33. In the embodiment, the surface of the surface layer 32 has a texture, and includes polyurethane resin, resistant and colorant. The resistant includes silicon so as to increase the abrasion resistance, and the colorant increases the UV resistance and the solvent resistance.

In the embodiment, the thickness of the polyurethane resin layer 35 is 0.10 to 0.20 mm, the thickness of the thermo-formable resin layer 34 is 0.02 to 0.55 mm, the thickness of the high-solid resin layer 331 is 0.20 to 0.45 mm, the thickness of the surface layer 32 is 0.01 to 0.05 mm, and the total thickness of the composite 3 is 0.33 to 1.25 mm.

The composite 2, 3 of the present invention can be attached to a casing of a substrate (for example, an electrical device) so as to improve the tactile quality of the substrate. The method for attaching the composite 2, 3 comprises but is not limited to the following three methods.

First, the composite 2, 3 is adhered to the casing of the substrate directly. Second, the composite 2, 3 is adhered to the casing of the substrate after thermoforming Third, the composite 2, 3 is thermoformed, and plastic is formed on the composite 2, 3 by injection molding so as to form the casing. Because the composite 2, 3 of the present invention has the thermo-formable resin layer 24, 34, the composite 2, 3 has good stability after thermoforming and avoids the usual problem of PC film 15 (FIG. 1) peeling off the composite 1.

Figure 15:
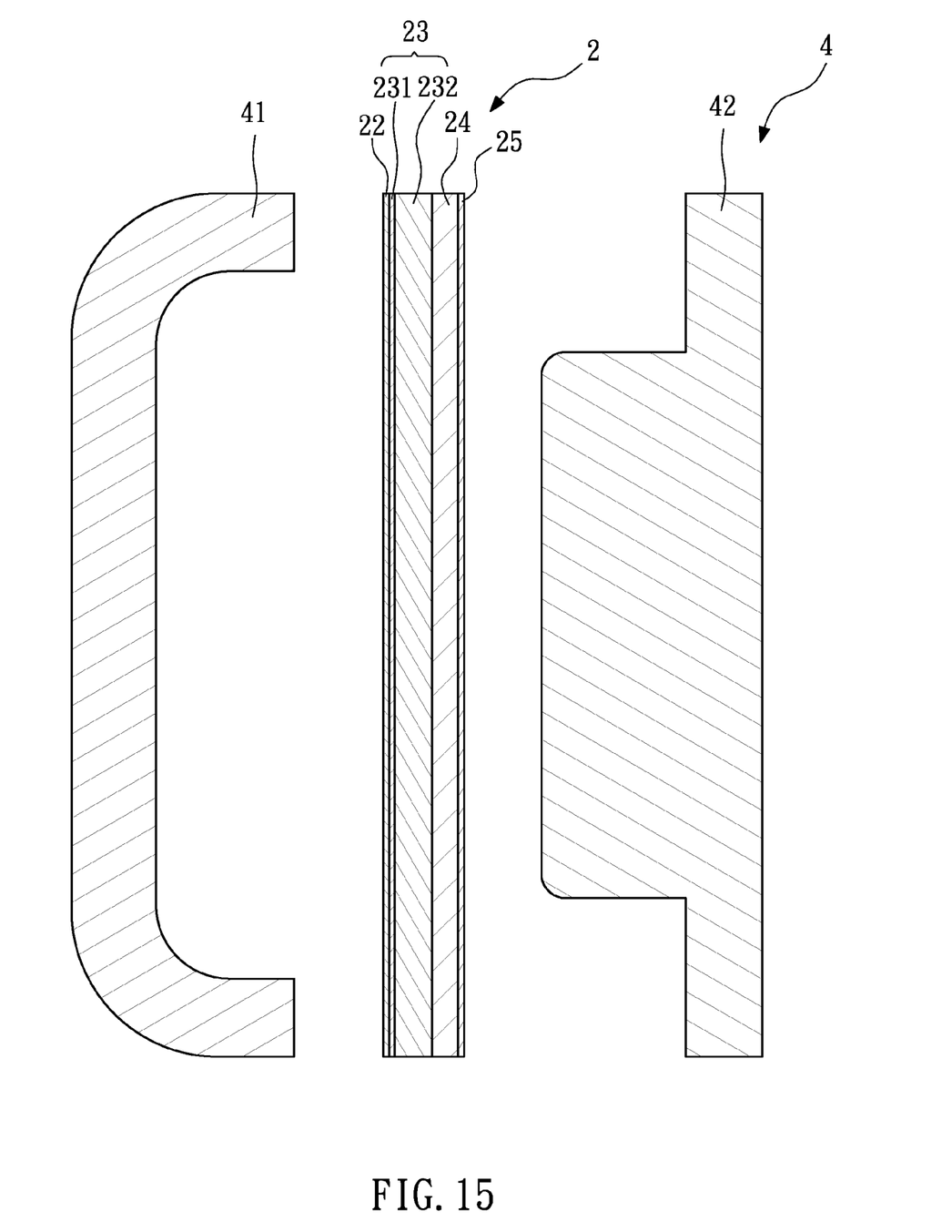
FIGS. 15 to 17 are cross-sectional views of a method for making a casing with a texture on the surface thereof according to the first embodiment of the present invention.
Figure 16:
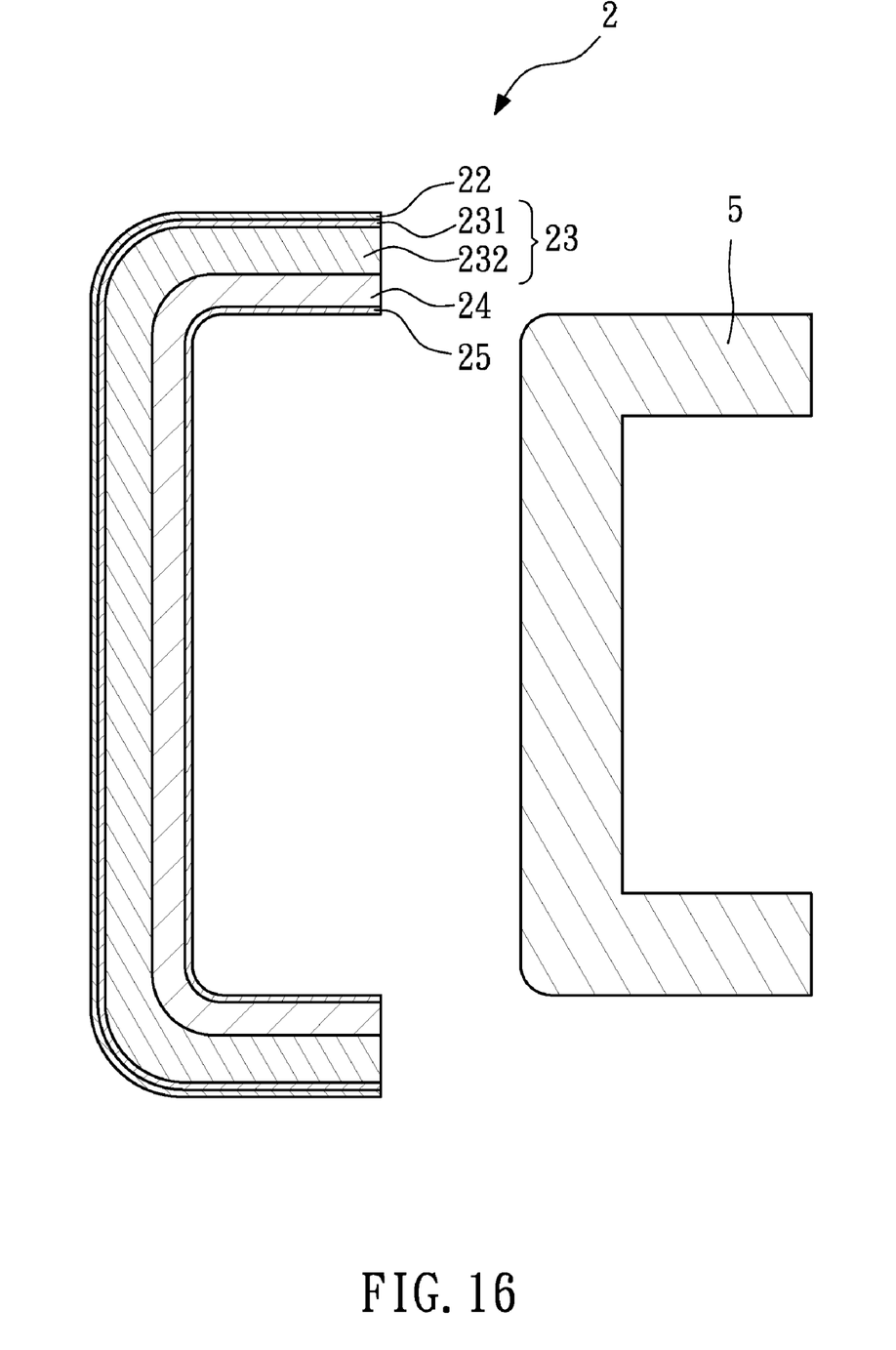
Figure 17:
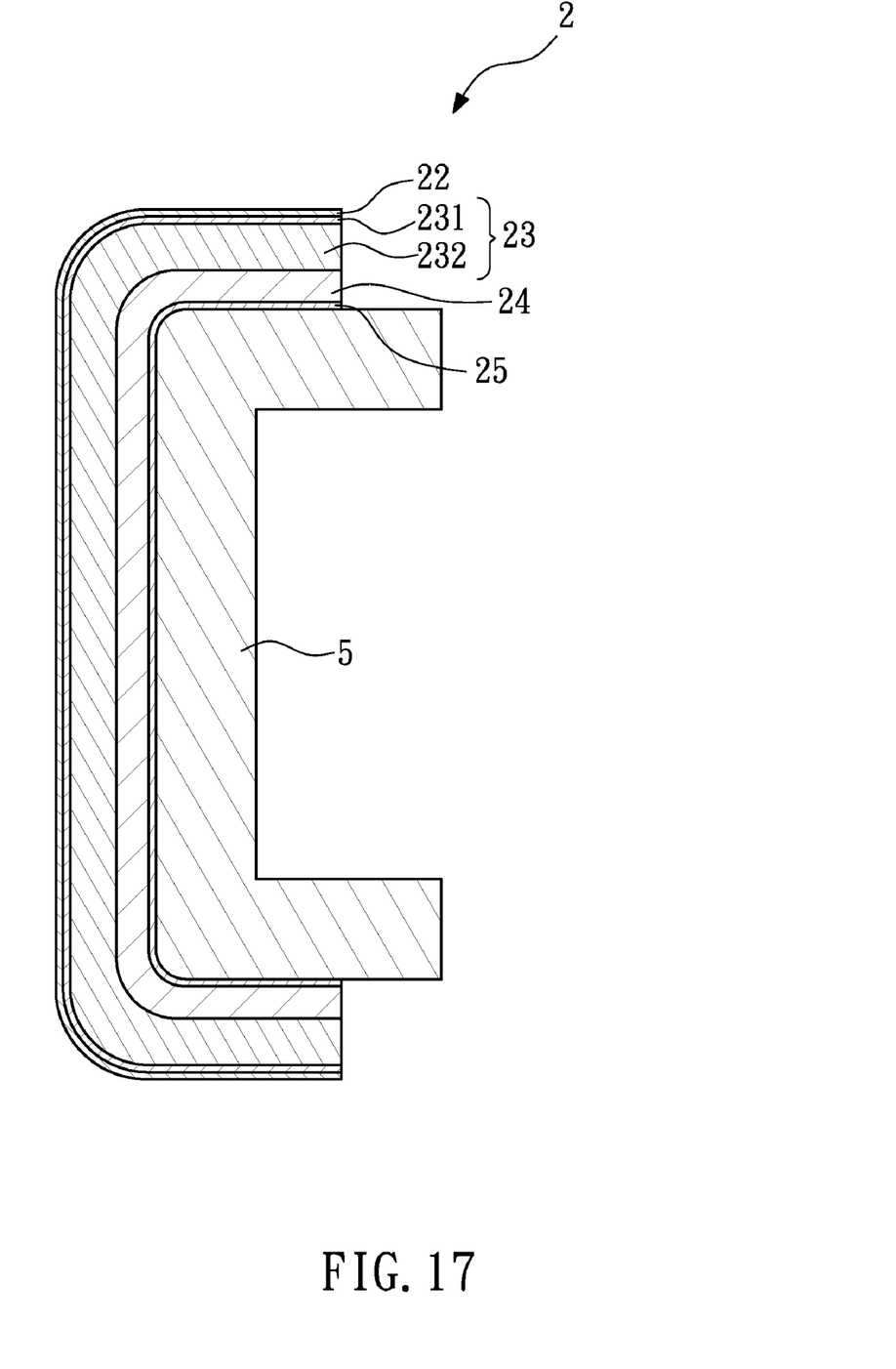

FIGS. 15 to 17 show cross-sectional views of the method for making a casing with a texture on the surface thereof according to the first embodiment of the present invention.

First, referring to FIG. 15, a composite is provided. The composite may be the composite 2 (FIG. 8) or the composite 3 (FIG. 14), and the composite 2 is illustrated hereinafter. The composite 2 includes a polyurethane medium layer 25, a thermo-formable resin layer 24, a base layer 23 and a surface layer 22. In the embodiment, the polyurethane medium layer 25 includes polyurethane resin and powder of inorganic salt of $CaCO_3$, and the modulus of deformation of the polyurethane resin is 20 to 150. The thermo-formable resin layer 24 is disposed on the polyurethane medium layer 25, and includes polyol. In the embodiment, the thermo-formable resin layer 24 further includes isocyanate, and the polyol is polycarbonate. The base layer 23 is disposed on the thermo-formable resin layer 24. In the embodiment, the base layer 23 includes an adhesive layer 231 and a polyurethane wet foamed layer 232. The polyurethane wet foamed layer 232 is adhered to the surface layer 22 by the adhesive layer 231. The surface layer 22 is disposed on the base layer 23, and the surface of the surface layer 22 has a texture. In the embodiment, the surface layer 22 includes polyurethane resin, resistant and colorant. The resistant includes silicon so as to increase the abrasion resistance, and the colorant increases the UV resistance and the solvent resistance.

Then, the composite 2 is thermoformed into a 3D appearance by a mold 4, and the 3D appearance corresponds to the shape of a casing 5 (FIG. 16). In the embodiment, the mold 4 includes a male mold 41 and a female mold 42. Referring to FIG. 16 again, a casing 5 is provided. Finally, referring to FIG. 17, the polyurethane medium layer 25 is adhered to the surface of the casing 5, so that the composite 2 is adhered to the casing 5.

Figure 18:
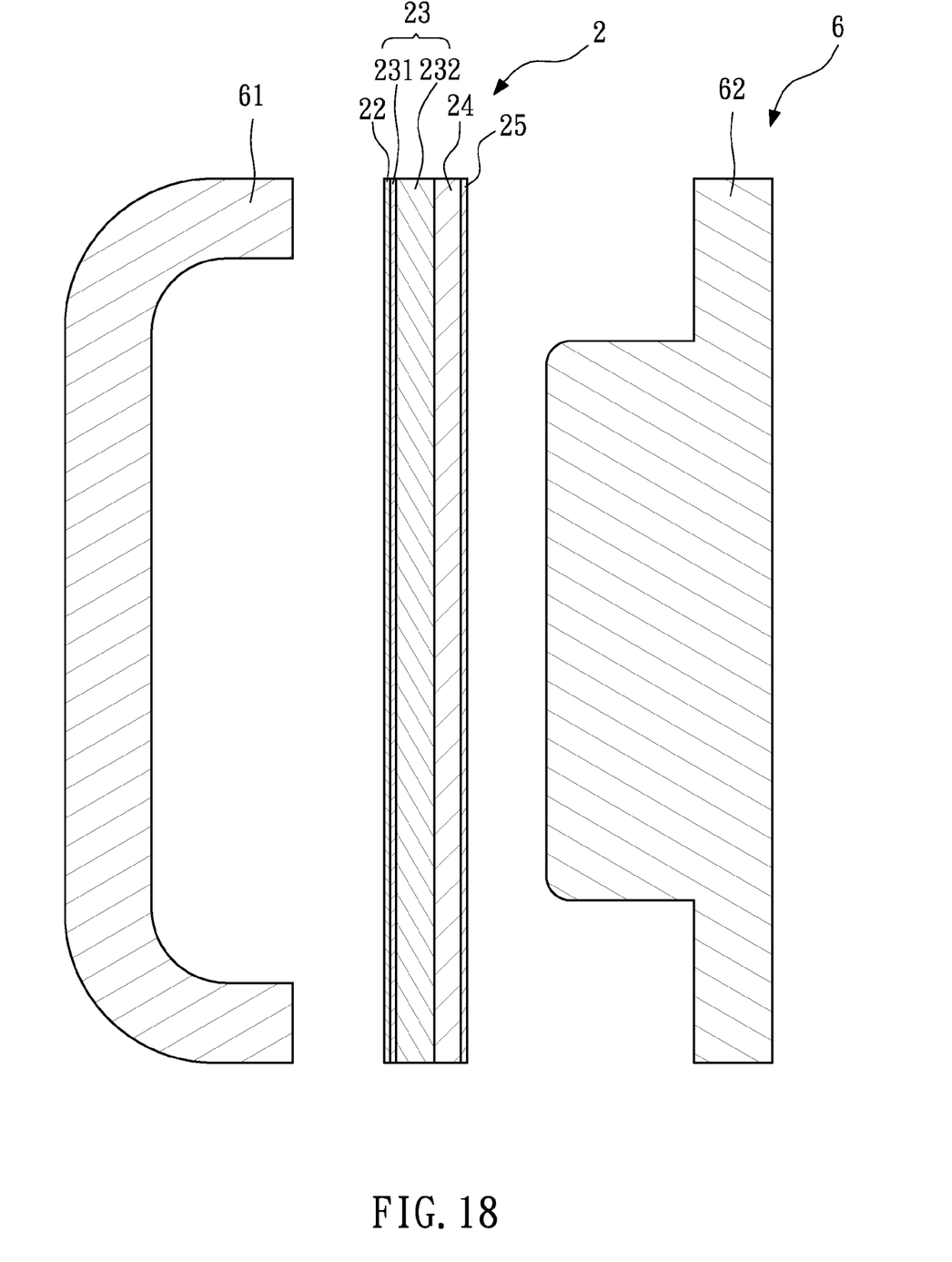
FIGS. 18 to 20 are cross-sectional views of a method for making a composite with thermo-formability according to the second embodiment of the present invention.
Figure 19:
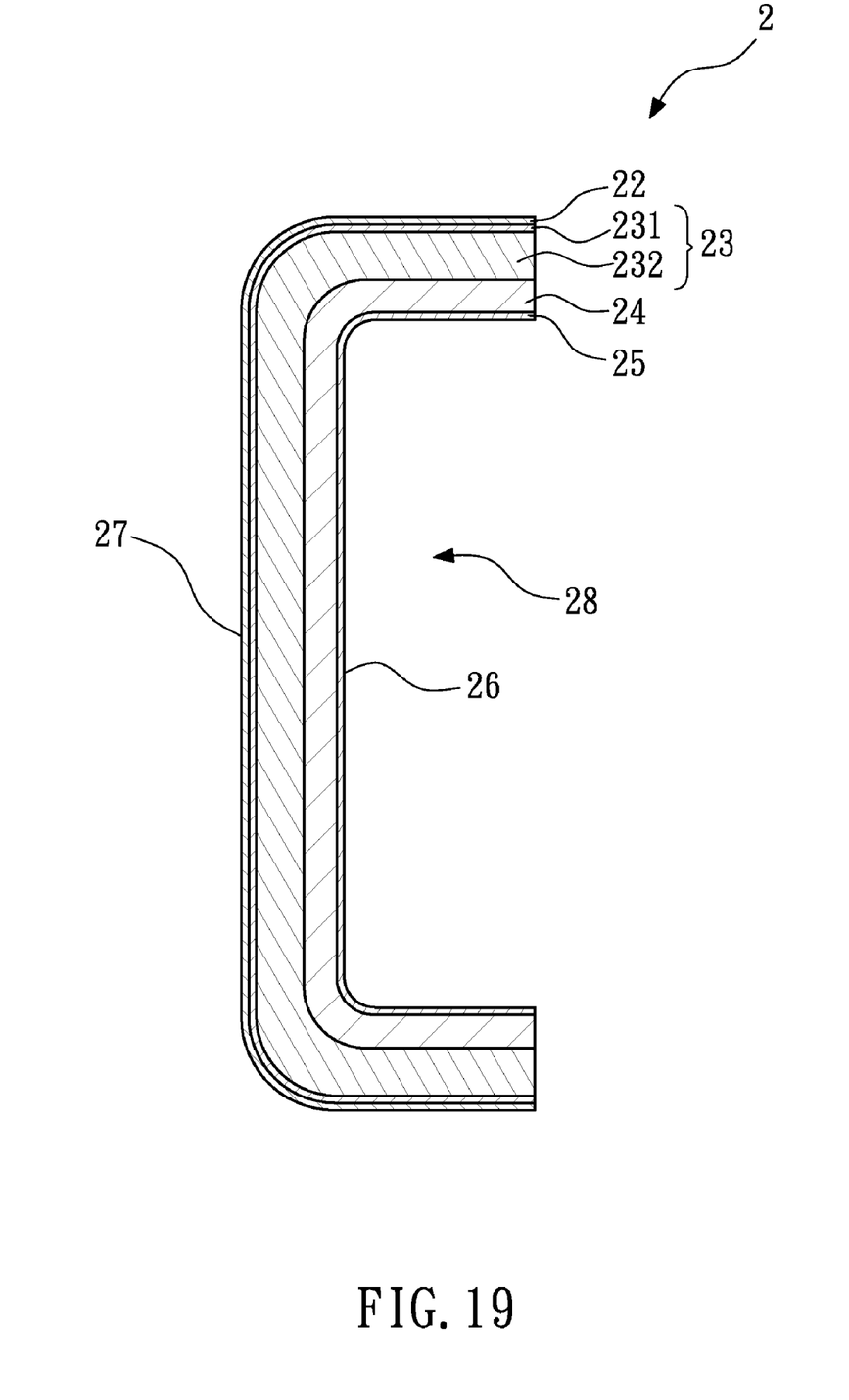
Figure 20:
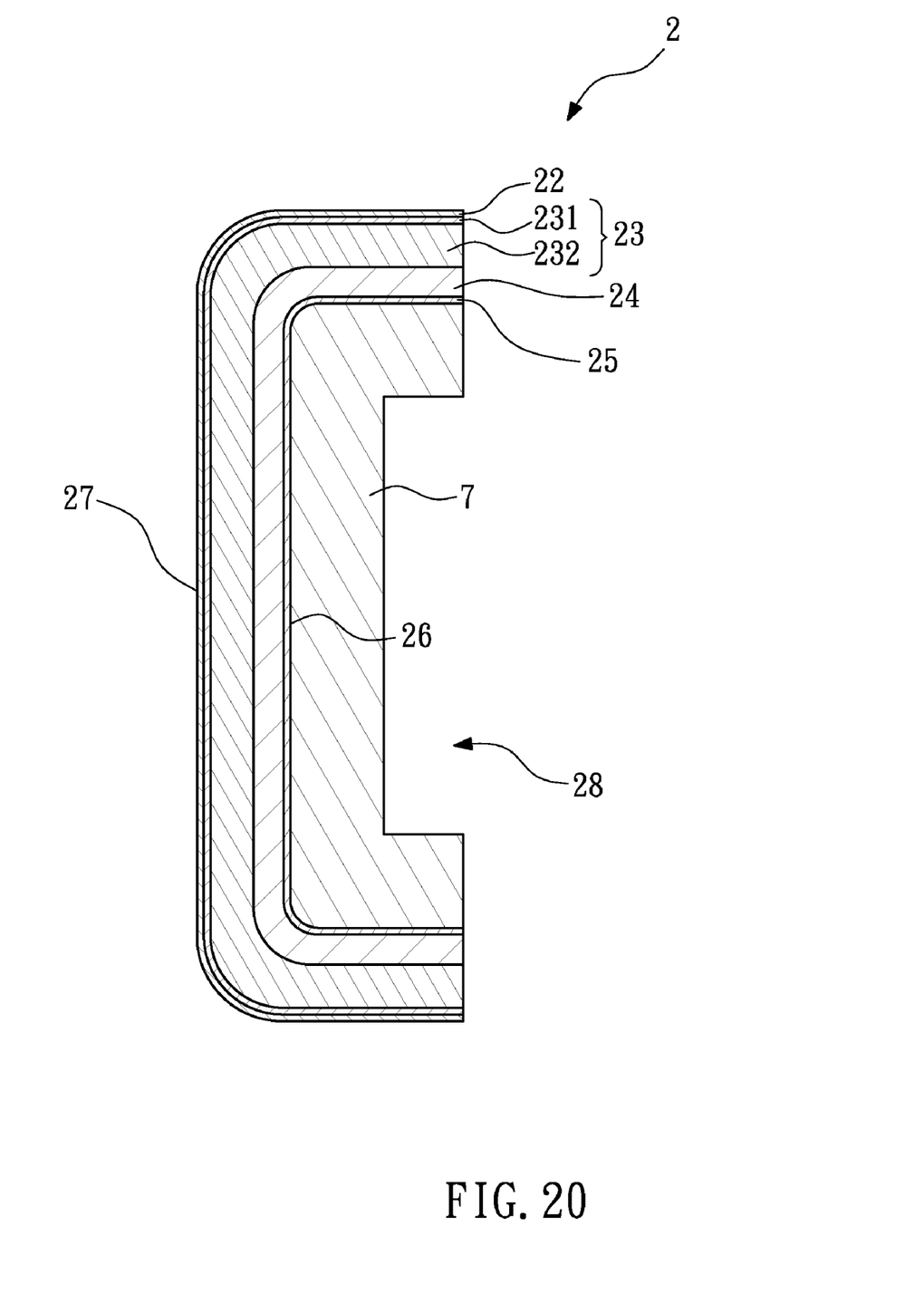

FIGS. 18 to 20 show cross-sectional views of the method for making a composite with thermo-formability according to the second embodiment of the present invention. First, referring to FIG. 18, a composite is provided. The composite may be the composite 2 (FIG. 8) or the composite 3 (FIG. 14), and the composite 2 is illustrated hereinafter. The composite 2 includes a polyurethane medium layer 25, a thermo-formable resin layer 24, a base layer 23 and a surface layer 22.

Then, referring to FIGS. 18 and 19, the composite 2 is thermoformed into a 3D appearance by a mold 6. In the embodiment, the mold 6 includes a male mold 61 and a female mold 62. After thermoforming, the composite 2 has an inner surface 26 and an outer surface 27, and the inner surface 26 defines an inner space 28. The inner surface 26 is the surface of the polyurethane medium layer 25, and the outer surface 27 is the surface of the surface layer 22. Finally, referring to FIG. 20, an in-mold-decoration process occurs, that is, plastic is formed on the inner surface 26 of the inner space 28 by inject molding so as to form a casing 7.

In the embodiment, the composite 2 has good stability after thermoforming, and plastic can be injected into the composite 2, so the conventional PC film is unnecessary.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. A method for making a composite with thermo-formability, comprising the steps of:
   (a) providing a release paper;
   (b) forming a surface layer on the release paper;
   (c) forming a base layer on the surface layer;
   (d) forming a thermo-formable resin layer that includes a polyol on the base layer;
   (e) forming a polyurethane medium layer on the thermo-formable resin layer wherein the polyurethane medium layer comprises a polyurethane resin and $CaCO_3$, and the modulus of deformation of the polyurethane resin is 20 to 150; and
   (f) removing the release paper.

2. The method as claimed in claim 1, wherein a surface of the release paper instep (a) has a texture; step (b) comprises coating the surface layer on the release layer, wherein the surface layer includes a polyurethane resin, an abrasion resistant comprising silicon, and a colorant; step (d) comprises coating the thermo-formable resin layer on the base layer, wherein the thermo-formable resin layer further comprises an isocyanate and the polyol is a polycarbonate polyol; and step (e) comprises coating the polyurethane medium layer on the thermo-formable resin layer.

3. The method as claimed in claim 1, further comprising a step of drying the surface layer after Step (b), a step of drying the thermo-formable resin layer after Step (d), and an aging step, which includes drying constantly over 24 hours in an oven without removing the release paper, after Step (e).

4. The method as claimed in claim 1, wherein Step (c) comprises the steps of:
   (c1) coating a high-solid resin layer on the surface layer, wherein the solid percentage of the high-solid resin layer is more than 40%; and
   (c2) drying the high-solid resin layer so as to form the base layer.

5. The method as claimed in claim 1, wherein Step (c) comprises the steps of:
   (c1) coating an adhesive layer on the surface layer;
   (c2) drying the adhesive layer; and
   (c3) forming a polyurethane wet foamed layer on the adhesive layer so as to form the base layer.

* * * * *